Figure 1:
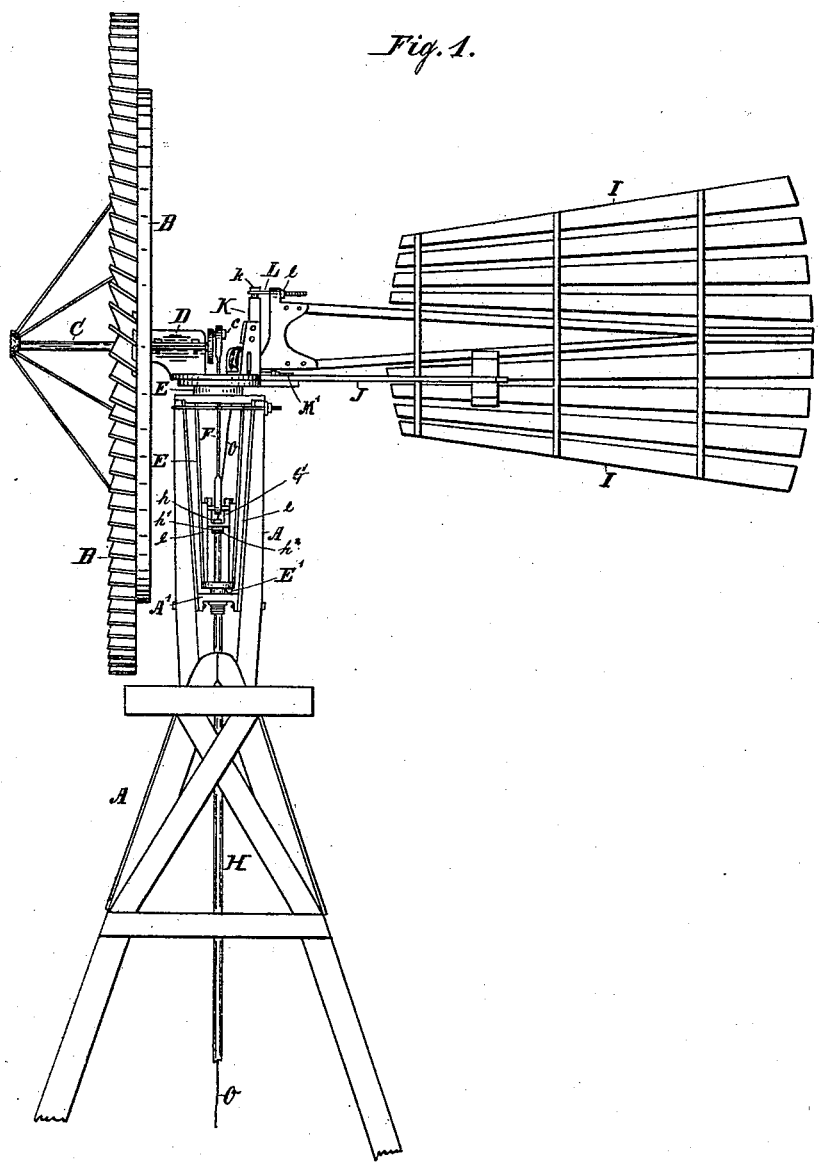

(No Model.)   F. BOOTS.   2 Sheets—Sheet 1.
Wind Engine.
No. 236,535.   Patented Jan. 11, 1881.

WITNESSES:
James B. Lizius,
R. P. Daggett.

INVENTOR:
Franklin Boots,
PER
C. Bradford,
ATTORNEY.

(No Model.) 2 Sheets—Sheet 2.
F. BOOTS.
Wind Engine.
No. 236,535. Patented Jan. 11, 1881.
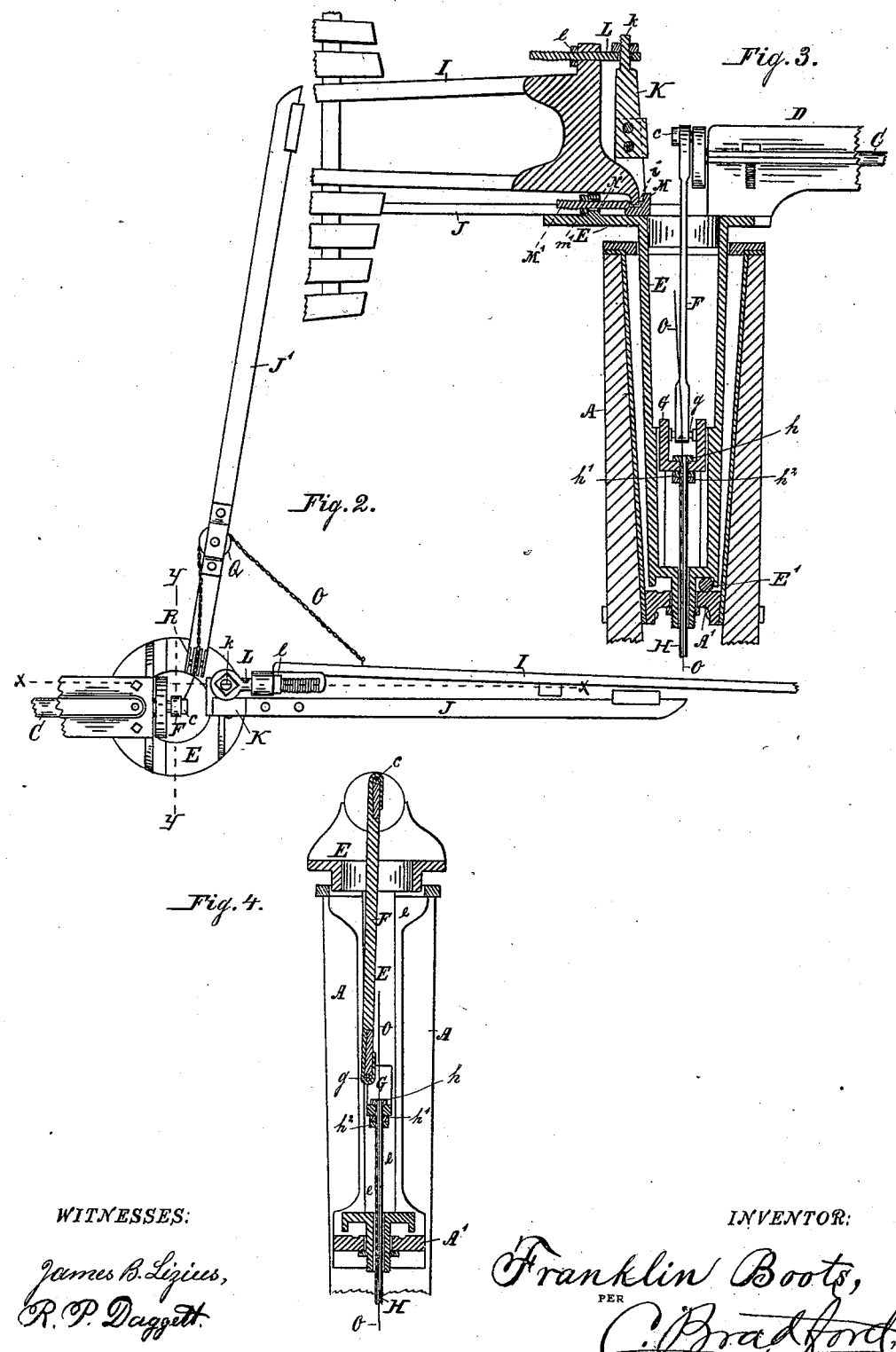
WITNESSES:
James B. Liziees,
R. P. Daggett.
INVENTOR:
Franklin Boots,
PER
C. Bradford,
ATTORNEY.
N. PETERS, PHOTO-LITHOGRAPHER, WASHINGTON, D. C.

UNITED STATES PATENT OFFICE.

FRANKLIN BOOTS, OF GREENFIELD, INDIANA.

WIND-ENGINE.

SPECIFICATION forming part of Letters Patent No. 236,535, dated January 11, 1881.

Application filed June 16, 1880. (No model.)

*To all whom it may concern:*

Be it known that I, FRANKLIN BOOTS, of the town of Greenfield, county of Hancock, and State of Indiana, have invented certain new and useful Improvements in Wind-Engines, of which the following is a specification.

My invention consists in so constructing and attaching the vane or rudder of a wind mill or engine that it shall be adjustable in that relation which enables it to operate as an automatic governor to regulate the speed of the driving or wind wheel, or, upon occasion, entirely stop the movement of said wheel, and also in improving some of the details of construction of such mill or engines, all of which will hereinafter be more particularly set forth.

Referring to the accompanying drawings, which are made a part hereof, Figure 1 is a side elevation of a windmill embodying my improvements. Fig. 2 is a top or plan view of so much thereof as is necessary to show such improvements and the surrounding parts. Fig. 3 is a longitudinal vertical section of Fig. 2 on the dotted line $x\ x$, and Fig. 4 is a transverse vertical section on the dotted line $y\ y$.

In said drawings, the portions marked A represent the frame-work on which the mechanism is mounted; B, the driving-sail or wind-wheel; C, the shaft thereto; D, the box to said shaft; E, a revolving frame mounted in the frame-work A, and carrying the box D and other mechanism; F, a pitman attached to a crank-wrist, $c$, on the shaft C, and having on its lower end a cross-head, G, which moves in slides $e\ e$, attached to the frame E; H, a pit-rod swiveled to the cross-head G, through which the pump or other machine is driven; I, the vane or rudder by which the proper position is maintained; J J', projecting arms, by which the lateral movement of the rudder is defined; K, an upwardly-projecting arm, which forms one point of attachment for the rudder; L, an eyebolt, by means of which the attachment is made to the arm K; M, a sliding block, having a screw-rod, M', attached thereto; N, a boss on the frame E, having a suitable orifice, through which the screw-rod M' passes; and O, a chain or cord passing over pulleys Q and R down through the frame-work, by means of which the rudder can be brought around parallel with the wind-wheel, and the latter thus stopped at any time, when desired.

The vane or rudder I is attached to the revolving frame by means of a pivot-like point, $i$, which rests in a suitable bearing in the sliding block M and the eyebolt L, the eye of which rests on the pivot $k$, formed on the arm K. The pivot $i$, as will be clearly seen in Fig. 3, is somewhat to the rear of the pivot $k$, and, as will be readily understood, this arrangement has the effect to keep the rudder in line with the wind-wheel shaft or against the arm J.

As is well known to those conversant with windmills, the tendency of the wind is to force the wind-wheel around in edgewise relation to the direction in which the wind is blowing, rather than to allow it to remain in proper position for work, facing the wind, and this tendency, which increases as the force of the wind increases, is counteracted by the rudder.

As it is desirable, in the event of heavy gales, to have the wind-wheel automatically assume the edgewise position, I have mounted the rudder in the manner just described, that it may be adjusted so that its own weight will hold it in position alongside the arm J when the wind is blowing with ordinary force, but so it shall be forced more and more toward the arm J' as the wind increases, and, finally, when the force to which it was adjusted has been reached, be brought alongside said arm J' and parallel with the face of the wind-wheel, which is stopped by being thus brought into substantially edgewise relation with the course of the wind, which materially diminishes the liability of its being damaged or destroyed in case of a severe storm. The extent of the effect which the wind shall have in varying the relative positions of the wind-wheel and rudder is determined by the relative positions of the bearings $i$ and $k$, which are varied at will by adjusting the nuts $m'$ and $l$ on the screw-rods M' and L, respectively. The arm K is divided into two parts, and the upper part made adjustable on the lower, thereby rendering the limit of adjustment still greater.

The rotating frame E rests on a ball, E', which runs in a groove in the supporting cross-bar A' of the frame A, whereby said frame E is enabled to readily move about as the wind changes its course.

The lower wrist, g, is arranged to one side of the cross-head, so that the chain or cord O may pass down through the center without coming in contact with said cross-head or with the pitman F.

The pit-rod H is swiveled to the cross-head and readily turns in its bearings. It is provided with a head, h, and jam-nuts $h'$ $h^2$, the latter of which serve from time to time to take up the slack caused by the wear of the parts. The rod H is also hollow, to permit the cord or chain O to pass down through it, and thus prevent the latter from getting tangled.

The advantage of having the vane or rudder adjustable, as specified, is that the same windmill can thus be made to answer varying requirements without difficulty.

Having thus fully described my said invention, what I claim as new, and desire to secure by Letters Patent, is—

1. The combination, with the rudder of a wind-engine, of an adjusting eyebolt, L, attached to a pivot, k, and a sliding adjustable bearing-block, M, in which the pivot i rests, all substantially as set forth.

2. The combination, in a windmill, of the vane or rudder I, arms J J', chain, cord, or wire O, pulleys Q R, cross-head G, having the wrist g to one side of the center, and the central hollow swiveling pit-rod, H, through which said chain or wire passes, all substantially as shown and described, and for the purposes specified.

In witness whereof I have hereunto set my hand and seal, at Greenfield, Indiana, this 9th day of June, A. D. 1880.

FRANKLIN BOOTS. [L. S.]

In presence of—
WILLIAM FRIES,
HENRY A. MANNON.